United States Patent Office 3,025,561
Patented Mar. 20, 1962

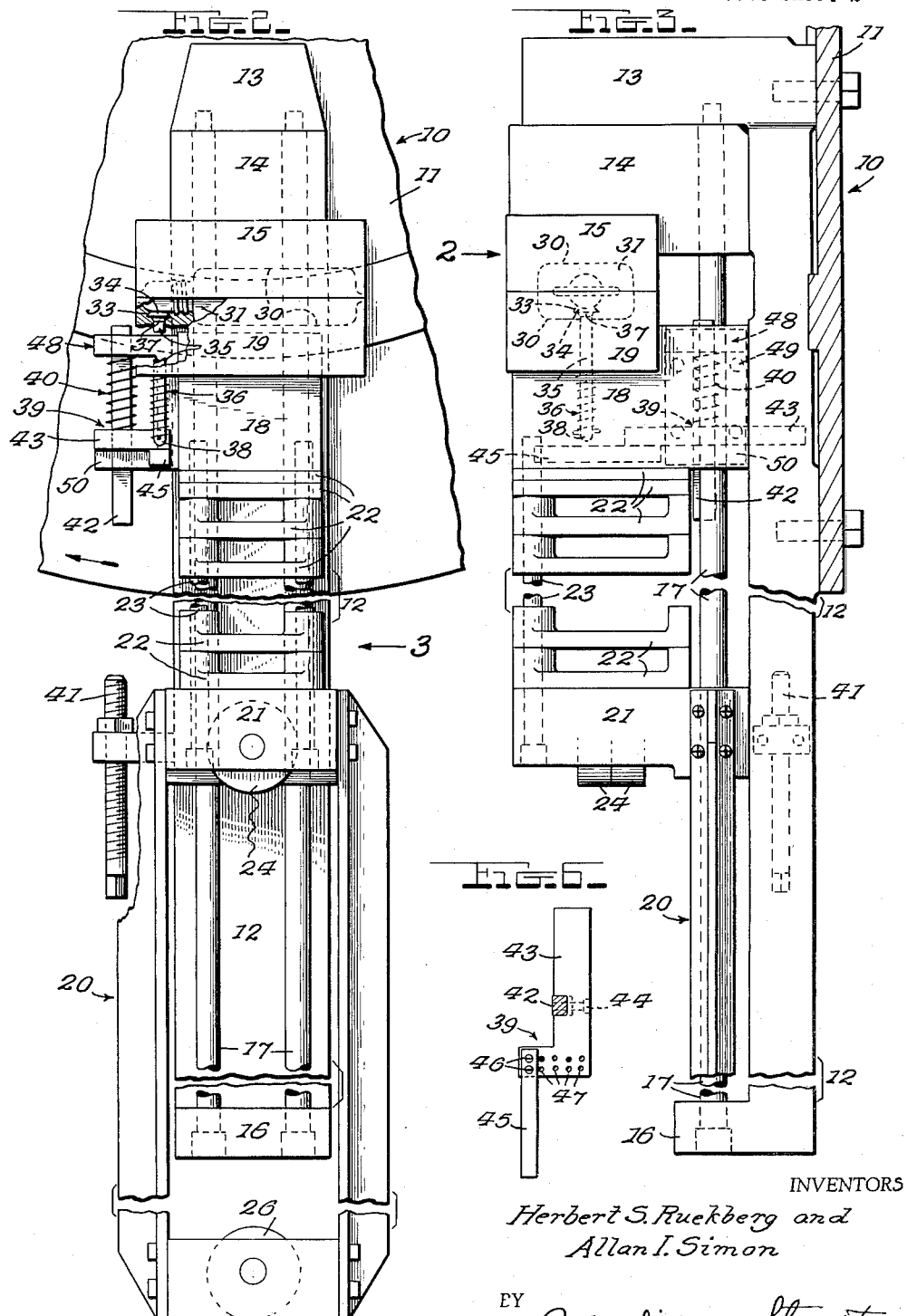

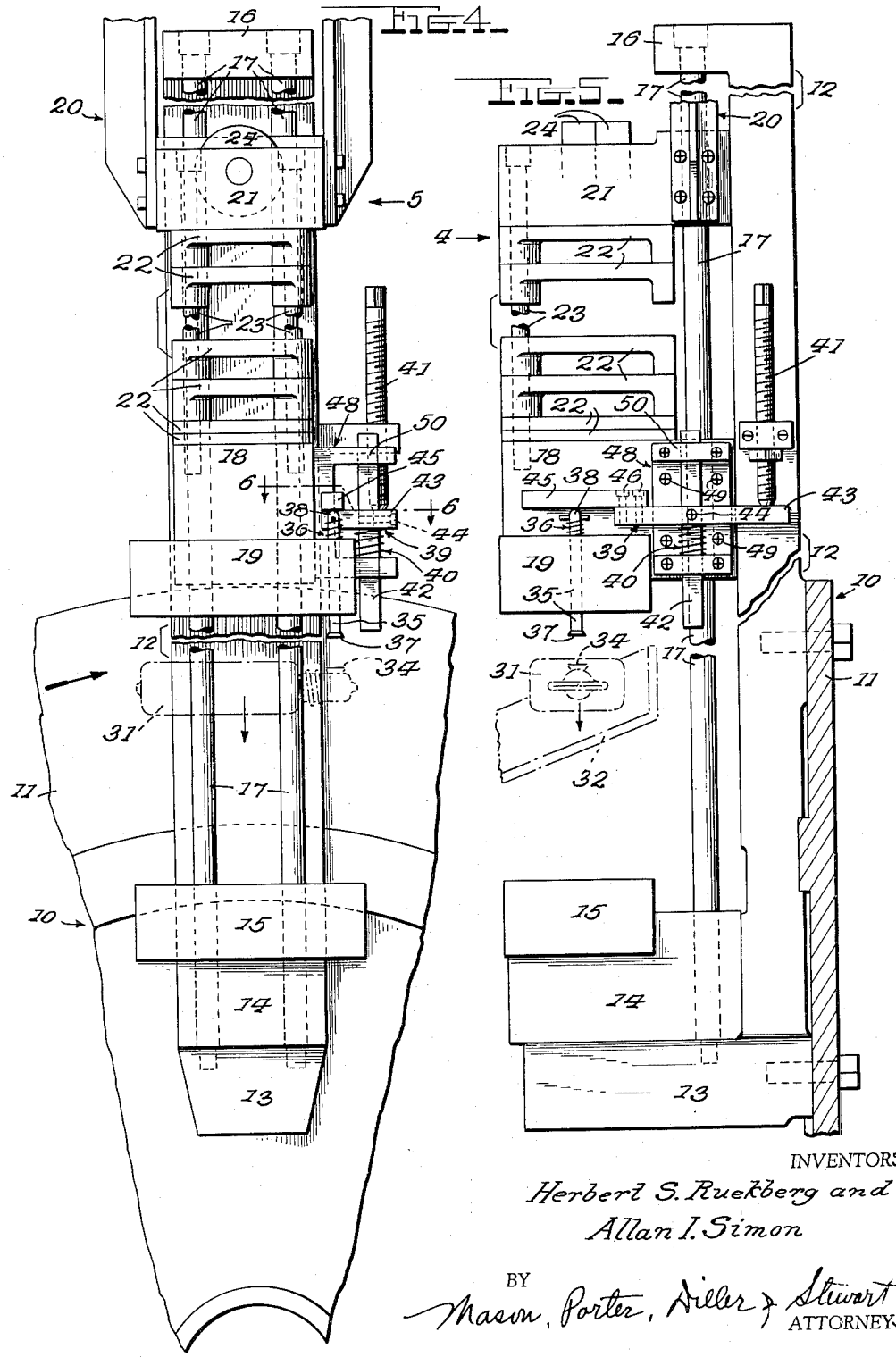

3,025,561
PLASTIC ARTICLE MACHINE
Herbert S. Ruekberg and Allan I. Simon, Highland Park, Ill., assignors to Continental Can Company, Inc., New York, N.Y., a corporation of New York
Filed Sept. 4, 1958, Ser. No. 758,985
5 Claims. (Cl. 18—5)

This invention relates generally to the molding of hollow articles from plastic material and relates specifically to improvements in a known machine for this purpose. This machine is disclosed in U.S. Patent 2,784,452, issued March 12, 1957 to Herber S. Ruekberg and John L. Szajna.

The known machine includes a rotor mounted on a substantially horizontal axis, inner mold halves secured to said rotor and equidistantly spaced from the rotor axis, outer mold halves movably mounted on said rotor for closing and opening movements with respect to said inner halves, and means for automatically operating said outer mold halves to successively close them for travel with the lower portion of the rotor and to successively open them for travel with the upper portion of said rotor. A plastic tube is extruded into the open molds as they pass a receiving station; each outer mold half then closes, entraps a length of the tube in the mold and seals the ends of the entrapped tube length. Then, as the closed mold travels with the lower portion of the rotor, compressed air is admitted to the entrapped tube length to expand it to the shape dictated by the mold cavity. Also, the mold is cooled to set the molded article. As the mold reaches the upper portion of the rotor, the outer movable mold half is opened, leaving the article in the inner fixed mold half. A knock-out pin then forces the article upwardly from the fixed mold half and it is grasped by hand and carried from the machine for finishing. This manual grasping and conveyance of the articles has necessarily meant that the machine be operated well below its otherwise potential capacity. Therefore, considerable thought has been given to merely providing a mechanical conveyor to receive the molded articles and carry them from the machine. However, this simple solution has been impracticable because of the fact that the articles are discharged upwardly from the lower mold halves and could not therefore merely fall upon a conveyor.

The present invention has aimed to overcome the problem in a simple and effective manner. In carrying out this end, a further object has been to eliminate the knock-out pin on each fixed mold half, provide for establishing a temporary connection between the movable mold half and the molded article to cause said movable mold half to elevate the article from the fixed mold half as the mold is opened, and to provide said movable mold half with an ejector which releases said temporary connection and downwardly discharges the article, therefore making it possible to install a conveyor to receive the articles and convey them from the machine.

A further object has been to provide each movable mold half with a shallow undercut socket to mold an external undercut projection on the molded article, to thereby establish the aforesaid temporary connection between said movable mold section and article, said projection being so located as to receive the thrust of the article ejector, thereby assuring direct forcing of said projection from the undercut socket and freeing the article.

Yet another object has been to provide a simple and effective operating means for the article ejectors of the various molds.

A still further object has been to make novel provision for operating the article ejector when the open mold has travelled to any desired position with the rotor, it being thus possible to localize the exact spot at which the article will be ejected.

With the above and other objects in view that will hereinafter appear, the nature of the invention will be more clearly understood by reference to the following detailed description, the appended claims and the several views illustrated in the accompanying drawings.

In the drawings:

FIGURE 2 is an enlarged front elevation, partly broken away, showing a lower portion of the rotor and elements thereon, the mold being closed.

FIGURE 3 is a view, partly in section, looking in the direction of the arrow 3 of FIGURE 2.

FIGURE 4 is an enlarged front elevation, partly broken away, showing an upper portion of the rotor and elements thereof, the mold being open.

FIGURE 5 is a view, partly in section looking in the direction of the arrow 5 of FIGURE 4.

FIGURE 6 is a detail horizontal section on line 6—6 of FIGURE 4.

Figure 1:
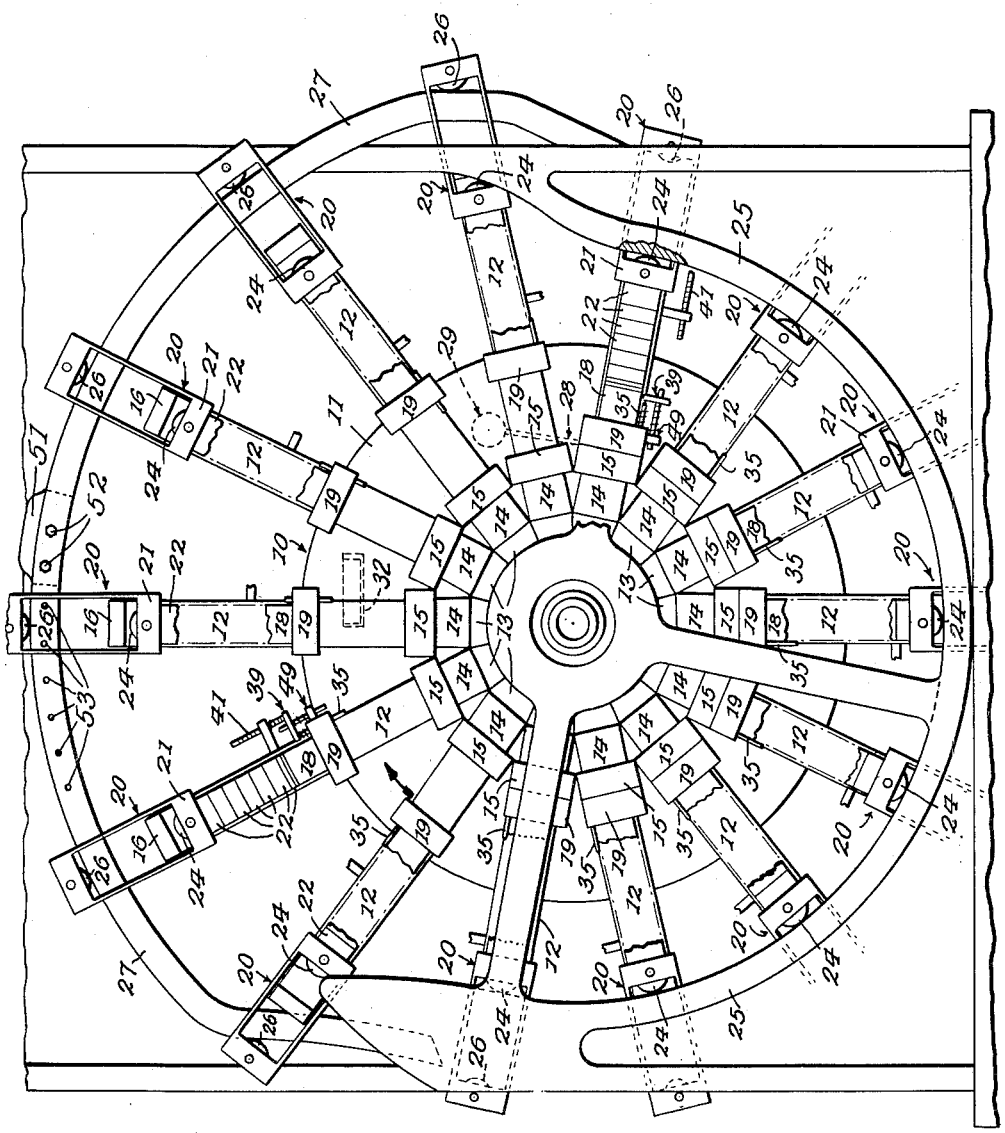
FIGURE 1 is a diagrammatic fragmentary front elevation showing the improved machine.

While pertinent retained elements of the prior machine have been shown in the drawing and will be briefly described, no disclosure has been given of the provision for cooling the molds, nor to the means for injecting compressed air to expand the mold-entrapped portions of the plastic tube into engagement with the molds, nor to the rotor driving means, as they may remain substantially as disclosed in the patent above referred to and disclosure of them herein would unnecessarily complicate the present disclosure.

The rotor 10 comprises a disk 11 and arms 12 secured to and projecting radially from said disk. The inner end of each of the arms 12 has an integral lateral lug 13. A carrier block 14 is shown secured directly against the lug 13 but spacers may be interposed between them. The inner mold halves 15 are secured to these carrier blocks 14. The outer end of each of the arms 12 has a lateral lug 16; and between this lug 16 and the inner lug 13, two parallel guide rods 17 extend. Upon the various pairs of rods 17, carrier blocks 18 for the outer mold halves 19 are slidably mounted for movement radially of the rotor axis to effect mold opening and mold closing. For each carrier block 18, an actuating yoke 20 is provided, said yoke having an inner end block 21 slidable on the rods 17. The carrier block 18 may be secured directly against the block 21 or a series of contacting spacers 22, at least one of which is yieldable may be interposed between said carrier block 18 and said block 21. Bolts 23 are shown extending through the block 21 and spacers 23 and threaded into the carrier block 18. By using some spacers between the fixed carrier block 14 and the lug 13 and other spacers between the movable carrier block 18 and the yoke end block 21, the spacing of the mold from the rotor axis may be varied as required. For the largest size molds which the machine can accommodate, all of the spacers are positioned between the fixed carrier block 14 and the lug 13.

The inner ends of the yokes 20 have rollers 24 cooperable with a cam track 25 (FIG. 1) to successively close the movable mold halves 19 and hold them closed while travelling with the lower portion of the rotor 10. The outer ends of the yokes 20 have additional rollers 26 cooperable with an additional cam track 27 to successively open the movable mold halves 19 and hold them open while travelling with the upper portion of the rotor 10.

Before closing each mold, it receives a plastic tube 28 (FIG. 1) from an extruder 29. When the mold closes, a length of the tube 28 is entrapped within it. The closing of the mold also tightly flattens the ends of the entrapped tube length and thus seals them. Then, compressed air is admitted to the entrapped tube length through a tubular needle as in the patent above referred to. Also, the mold halves 15 and 19 are cooled as in this patent or otherwise. The compressed air expands the entrapped tube length into conformity with the molding cavities 30 (FIGS. 2 and 3) of the mold halves 15 and 19 and each mold thus shapes and cools an article 31 as the mold travels with the lower portion of the rotor 10. Upon complete molding and cooling of the articles 31, the outer mold sections are successively opened for article discharge.

In the above mentioned patent, the molded articles are left in the fixed mold halves as the movable mold halves open upwardly therefrom. Then the articles are knocked upwardly from the fixed mold halves by knock-out pins associated with said fixed halves; and said articles are grasped by hand and carried from the machine for finishing. In the present invention, the molded articles 31 remain temporarily in the movable mold halves 19 and are elevated from the fixed mold halves 15 as said movable mold halves ascend to open position. Also, provision is made for downwardly ejecting the elevated molded articles 31 from the open mold halves. The articles may therefore fall onto suitable means for a rapid conveyance from the machine. For illustrative purposes, a chute 32 has been indicated in broken lines in FIG. 5 to receive the articles and convey them from the machine for finishing.

In order to insure elevation of each molded article 31 with the associated outer mold half 19, provision is made for establishing a temporary connection between said article and said mold half. This is preferably accomplished in the manner shown in FIGS. 2 and 3.

A shallow, undercut socket 33 is formed in the mold half 19 in communication with the molding cavity 30 of said half. This socket molds an undercut external projection 34 on the article and establishes the desired temporary connection between the article 31 and the mold half 19. The projection 34 is preferably formed on a portion of the molded article which is to be cut off during article finishing. This projection must be forced from the socket 33 during article ejection and the ejecting means preferably thrusts directly against said projection.

The ejecting means is shown in the form of a pin 35 extending slidably through the movable mold half 19 and biased to inactive position by a spring 36. When in this position, the inner article engaging end 37 of the pin 35 is in position to thrust against the projection 34 of the molded article 31 as seen in FIG. 2. The outer end 38 of the ejector pin 35 is then in position to engage an actuator 39, which is mounted to move with the outer mold half 19 as this mold half is opened and closed. A spring 40 biases the actuator 39 to the inactive position shown in FIGS. 2 and 3 and in the lower right portion of FIG. 1, as long as the movable mold half 19 remains closed against the fixed mold half 15 and during all but the final opening of said mold half 19.

A stop screw 41 is provided for each actuator 39, said screw being mounted on the rotor arm 12 in the path on which said actuator moves outwardly during the opening movement of the mold half 19. When this mold half 19 almost completes its opening movement, the actuator 39 strikes and is stopped by the screw 41. The ejector pin 35 then strikes and is stopped by the actuator 39. The ejector pin 35 then stops outward movement of the article 31 with the mold half 19 and as this mold half completes its outward movement, the temporary connection between said mold half and article is released and the article drops onto the conveying means 32 and is carried from the machine for finishing.

The actuator 39 illustrated more particularly in FIGS. 2, 4, 5 and 6, is shown as comprising a pin 42 and a two-section cross arm thereon. One section 43 of this cross arm is secured at 44 to the pin 42 and has one of its ends positioned to coact with the stop screw 41. The other end of the one cross arm section 43 and a second across arm section 45 which coacts with the ejector pin 35, are secured together. The securing means preferably comprises a screw 46 receivable in any of spaced pairs of openings 47. This provides for setting of the arm section 45 for molds of different lengths. The cross arm section 45 is of sufficient length to coact with the ejector pins of mold halves of different widths.

A bearing bracket 48 is secured at 49 to the carrier block 18 of the movable mold half 19 for slidably mounting the actuator 39. While this bearing bracket 48 (and also the actuator 39) are only diagrammatically indicated in FIG. 1, said bracket is preferably of the U-shape shown in other views; and one arm 50 of this bracket coacts with the cross arm section 43 to limit the movement of the actuator 39 under the influence of the spring 40, as seen in FIGS. 2 and 3.

In FIG. 1, a short cam 51 has been shown at the periphery of the mold opening track 27 for coaction with the yoke rollers 26 in effecting article ejection. This cam 51 may be shifted to any desired position along the upper portion of the track 27 and then secured. Securing bolts 52 are shown to engage spaced openings 53 in the track 27 to allow the desired positional adjustment of the cam 51. By outwardly adjusting the above described screws 41 to such positions that the ejector actuators 39 will not strike them until the yoke rollers 26 are moved further outward by the cam 51, the spot at which article ejection will occur may be accurately localized.

Without restatement, it will be seen that novel and advantageous construction has been disclosed for improving the operation of the prior machine. However, it is to be understood that variations may be made within the scope of the invention.

We claim:

1. Improvements in a plastic article molding machine of the type having a rotor mounted on a substantially horizontal axis, an inner mold half secured to said rotor, an outer mold half movably mounted on said rotor for closing and opening movements with respect to said inner mold half, and means for automatically operating said outer mold half to close it for travel with the lower portion of said rotor and to open it for travel with the upper portion of said rotor; said improvements comprising a molding formation in said outer mold half for so shaping a portion of the article as to establish a temporary connection between said outer mold half and the molded article, said temporary connection being of sufficient strength to allow said outer mold half to elevate the molded article from said inner mold half when said outer mold half is opened, an article ejector associated with said outer mold half for disconnecting the elevated article from the opened outer mold half and downwardly ejecting said molded article for conveyance from the machine, means for automatically operating said ejector when said outer mold half is opening, and conveyor means for receiving the discharged articles, said conveyor means including a fixed article receiving portion disposed in the plane of said mold halves and intermediate the paths of said inner mold half and said outer mold half at the point of article discharge.

2. The improved machine specified in claim 1, in which said molding formation comprises a shallow undercut socket in said outer mold half and communicating with the molding cavity thereof to mold an undercut external projection on the molded article, said ejector being positioned to push against said projection.

3. A structure as specified in claim 1, in which said ejector includes an actuator-engaging end facing substantially away from the rotor axis and an article-engaging end facing substantially toward said axis, spring means biasing said ejector away from said rotor axis to inactive position; said ejector operating means comprising an actuator cooperable with said actuator engaging end of said ejector, means mounting said actuator for movement with said outer mold half during the opening and closing movements of said outer mold half, means yieldably biasing said actuator away from the rotor axis to inactive position, said actuator mounting means and actuator being so engaged with each other as to allow further opening movement of said outer mold half after the outward movement of said actuator with said outer mold half has been arrested, and a stop secured to said rotor in position to arrest said outward movement of said actuator.

4. A structure as specified in claim 1, in which said ejector includes an actuator-engaging end facing substantially away from the rotor axis and an article engaging end facing substantially toward said axis, spring means biasing said ejector away from said rotor axis to inactive position; said ejector operating means comprising a pin and a cross arm secured thereon, said pin and cross arm jointly forming an actuator, one end of said cross arm being cooperable with said actuator engaging end of said ejector, bearing means movable bodily with said outer mold half and slidably mounting said pin in substantially parallel relation with the line of movement of said ejector, spring means biasing said pin away from the rotor axis to inactive position, said spring means allowing further opening movement of said outer mold half after the outward movement of said pin with said outer mold half has been arrested, and a stop secured to said rotor in position to abut the other end of the aforesaid cross arm and limit said outward movement of said pin.

5. In a plastic article molding machine of the type for blow-molding articles from an extruded plastic tube through the injection of air utilizing a blow needle and having a fixed mold half and a relatively movable mold half which ascends from said fixed mold half for removal of a molded article; mold halves having a combined cavity for defining an article having a hollow waste extension for reception of a blow needle, said movable mold half having a shallow undercut socket opening into said movable mold half cavity in alignment with that portion of said cavity adapted to receive the waste portion of an article so as to form on the waste portion of an article an undercut projection by internal pressure within the waste portion, thereby establishing a temporary connection between said movable mold half and the molded article and allowing said movable mold half to elevate the molded article from the fixed mold half when said movable mold half is raised, and an article ejector carried by said movable mold half and extending therethrough in alignment with said undercut socket to push downwardly against the undercut projection.

References Cited in the file of this patent

UNITED STATES PATENTS

| | | |
|---|---|---|
| 2,582,891 | Strauss | Jan. 15, 1952 |
| 2,784,452 | Ruekberg et al. | Mar. 12, 1957 |
| 2,799,049 | Wilson | July 16, 1957 |
| 2,837,765 | Harvey | June 10, 1958 |
| 2,839,786 | Alesi | June 24, 1958 |